(12) United States Patent
Converse et al.

(10) Patent No.: US 10,760,996 B2
(45) Date of Patent: Sep. 1, 2020

(54) MACHINE COMMISSIONING SYSTEM AND METHOD

(71) Applicant: Caterpillar Inc., Peoria, IL (US)

(72) Inventors: Perry Converse, Lafayette, IN (US);
Michael Coppinger, Hamburg (DE);
Yanchai Zhang, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 565 days.

(21) Appl. No.: 15/646,736

(22) Filed: Jul. 11, 2017

(65) Prior Publication Data

US 2019/0017900 A1    Jan. 17, 2019

(51) Int. Cl.
*G01M 15/05* (2006.01)
*G01M 13/00* (2019.01)

(52) U.S. Cl.
CPC ............. *G01M 15/05* (2013.01); *G01M 13/00* (2013.01)

(58) Field of Classification Search
CPC .................................................... G01M 15/05
See application file for complete search history.

(56) References Cited

U.S. PATENT DOCUMENTS

| | | | |
|---|---|---|---|
| 6,338,018 B1 * | 1/2002 | Baker | F02D 41/1446 |
| | | | 701/104 |
| 7,512,477 B2 | 3/2009 | Quigley et al. | |
| 8,602,772 B2 | 12/2013 | Fan et al. | |
| 8,903,559 B2 | 2/2014 | Coyne et al. | |
| 9,246,757 B2 | 1/2016 | Balog et al. | |
| 9,450,925 B2 | 9/2016 | Driscoll | |
| 2007/0203625 A1 * | 8/2007 | Quigley | F02D 41/1406 |
| | | | 701/103 |
| 2010/0049841 A1 | 2/2010 | Wang | |
| 2016/0036658 A1 | 4/2016 | Kumar | |

* cited by examiner

*Primary Examiner* — Manuel A Rivera Vargas
(74) *Attorney, Agent, or Firm* — Brannon Sowers & Cracraft PC

(57) ABSTRACT

A system for commissioning a machine such as an internal combustion engine includes commissioning probes, and a user interface having a computer receiving test data from the commissioning probes. The computer is structured to store a commissioning profile for the machine on a memory, and to populate the commissioning profile based on a compensation factor that depends on a difference between a performance response of ancillary equipment connected with the machine and an expected response. The computer outputs a commissioning suitability signal based on comparing the commissioning profile to a target profile.

20 Claims, 3 Drawing Sheets

MACHINE COMMISSIONING SYSTEM AND METHOD

TECHNICAL FIELD

The present disclosure relates generally to a machine commissioning system, and more particularly to compensating for differences between a performance response of ancillary equipment and an expected response, in determining suitability of a machine for commissioning.

BACKGROUND

A structured commissioning process for certain machine assets allows a standardized set of performance and inspection criteria to be applied to a machine, and its condition and performance assessed prior to being released to service or activating a warranty. In the case of machinery used in a marine environment or certain other operating locations or operating conditions, a machine to be commissioned will typically be operated for an initial period of time to enable operation and performance data to be evaluated in connection with commissioning by a manufacturer, a dealer, or a third party provider. During this preliminary data gathering phase, a computer coupled with the machine gathers data from on-board sensors, and stores the data for later use in evaluating whether the machine is suitable for commissioning. While certain assets can be commissioned at the factory, certain other assets are typically only evaluated for commissioning under conditions similar or identical to those expected to be encountered in the field.

For example, in the commissioning of certain internal combustion engines used with marine vessels it is typical for a marine vessel to go to sea under power produced by the subject engine, with data as to performance and behavior of the engine logged over the course of many hours of operation. Since tests for commissioning suitability are often carried out only under certain conditions, such as steady state conditions of engine operation, there may be significant periods of time where conditions are not suitable for testing, and only periodically can data be gathered at all. Once the marine vessel returns to port or is otherwise at a location, for example, with robust telecommunications capability, the commissioning data can be transmitted to a commissioning authority such as a dealer or manufacturer for evaluation. If the tests are satisfied or not satisfied, then the commissioning authority can formally notify the owner of the engine of its status.

One known computer aided commissioning strategy is set forth in U.S. Pat. No. 6,338,018 to Baker. Baker proposes commissioning an internal combustion engine controlled by an engine control unit, where an engine mapping function is executed to map the engine at a combination of speeds and loads to build up a full set of engine operating parameters. Baker apparently employs a display of cells arranged in a grid, with some of the cells displayed in a visually distinct manner relative to other cells to assist in adjusting the value of certain parameters towards optimum values. While Baker may have certain applications, particularly at the factory, there is ample room in the field of asset commissioning for further advancements.

SUMMARY OF THE INVENTION

In one aspect, a system for commissioning a machine includes a plurality of commissioning probes structured to monitor a plurality of operating parameters of the machine, and a user interface coupled with the plurality of commissioning probes. The user interface includes a computer and a computer readable memory. The computer is structured to receive test data from the plurality of commissioning probes, and to store a commissioning profile for the machine that is based on the test data on the computer readable memory. The computer is further structured to determine a compensation factor that is based on a difference between a performance response of ancillary equipment connected with the machine, and an expected response, and to determine the commissioning profile based on the compensation factor. The computer is further structured to compare the commissioning profile to a target profile, and to output a commissioning suitability signal that is based on the comparing of the commissioning profile to the target profile.

In another aspect, a method of determining suitability of a machine for commissioning includes receiving test data produced by a plurality of commissioning probes coupled with a machine to be commissioned, and being indicative of a plurality of operating parameters of the machine. The method further includes populating a commissioning profile for the machine based on the test data, and determining a compensation factor based on a difference between a performance response of ancillary equipment connected to the machine, and an expected response. The method further includes determining the commissioning profile based on the compensation factor, comparing the commissioning profile to a target profile, and producing a commissioning suitability signal based on the comparing of the commissioning profiling to the target profile.

In still another aspect, a machine system includes a machine and ancillary equipment connected to the machine. A commissioning system includes a plurality of commissioning probes structured to monitor a plurality of operating parameters of the machine, and a user interface coupled with the plurality of commissioning probes, and including a computer and a computer readable memory. The computer is structured to receive test data from the plurality of commissioning probes, and to store a commissioning profile for the machine on the computer readable memory based on the test data. The computer is further structured to determine a compensation factor that is based on a difference between a performance response of ancillary equipment connected the machine, and an expected response, and to determine the commissioning profile based on the compensation factor.

DETAILED DESCRIPTION

Figure 1:
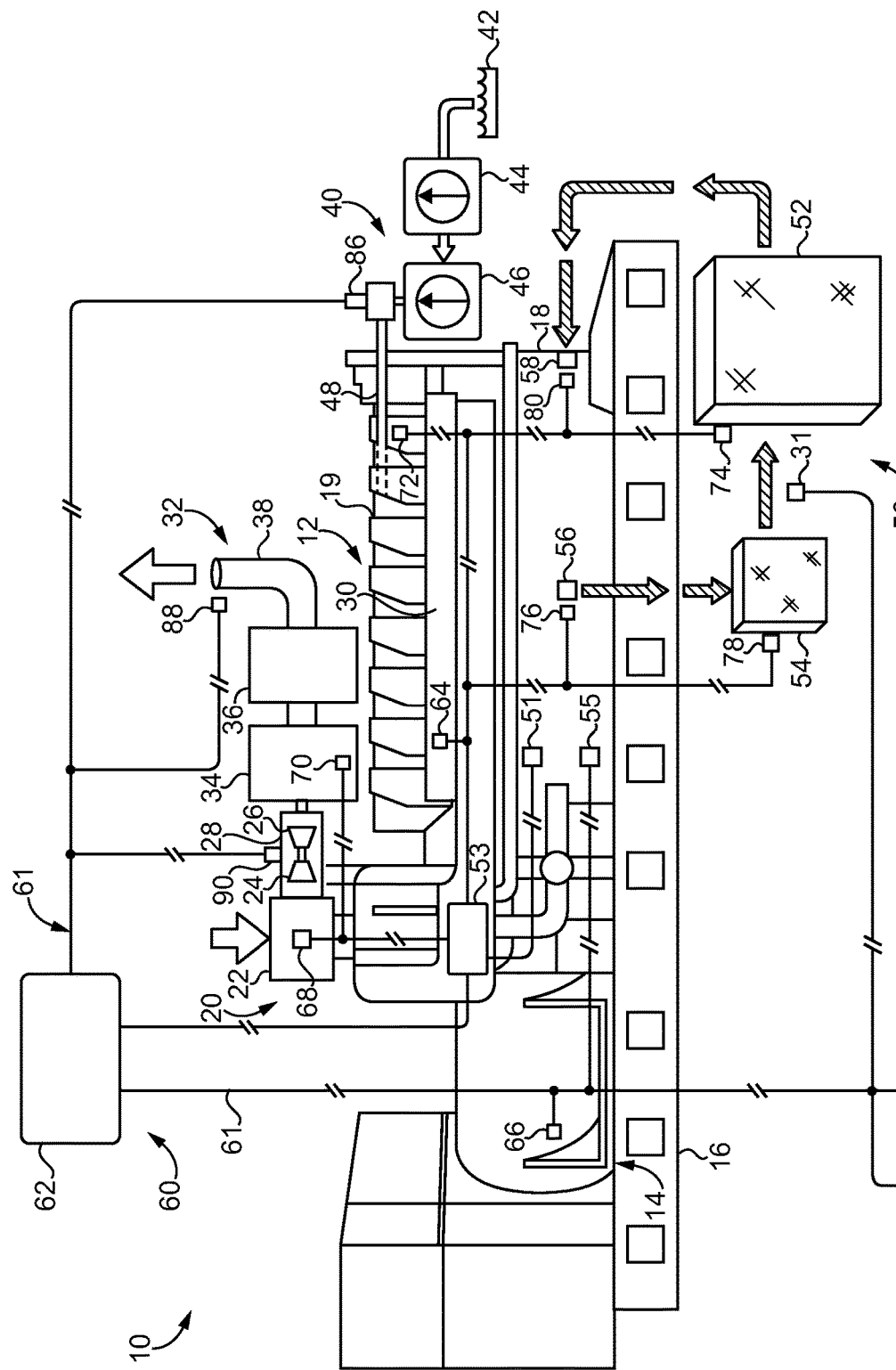
FIG. 1 is a diagrammatic view of a machine system, according to one embodiment.

Referring to FIG. 1, there is shown a machine system 10 according to one embodiment, and illustrated in the context of an engine generator set or "genset" having an internal combustion engine 12 coupled with an electrical generator 14. A genset is but one example of a machine system contemplated in the present context, and embodiments may include engines coupled with a pump, a compressor, a propulsion drive in a marine vessel, or merely a stand-alone engine not yet dedicated to any particular application. Engine 12 could include a compression ignition diesel engine, a spark-ignited gaseous fuel or gasoline engine, or a different type of combustion engine altogether such as a gas turbine engine. Moreover, machine systems are contemplated where the "machine" is itself a pump, a compressor, mining equipment, industrial processing equipment, or a variety of other types of machines. In the illustrated embodiment engine 12 and generator 14 are mounted to a frame in the nature of a skid 16. Skid 16 could be mounted to the body of a marine vessel, to an offshore oil or gas platform, a locomotive frame, or any other machinery support structure or none at all. Alternative packaging and mounting strategies could be used as well. Those skilled in the art will be familiar with commissioning practices used for certain types of machine equipment. A system 60 for commissioning a machine such as engine 12 is also part of machine system 10. Those skilled in the art will be familiar with the practice of commissioning a machine in an actual service environment. It has been observed that the actual service environment can differ with regard to factors such as environmental conditions, machine application, and equipment with which a particular machine is used relative to such factors at the time of manufacturing, testing, and initially setting up the machine for operation. As will be further apparent from the following description, system 60 is adapted to account for variability or shifts in such factors in a manner contemplated to simplify the commissioning process and increase validity and reliability thereof.

Engine 12 includes an engine housing 18 having a plurality of cylinders (not shown) formed therein, and an engine head 19 formed in one or more pieces attached to engine housing 18. Various ancillary equipment is connected with engine 12 including, for example, an air system 20, an exhaust system 32, and a cooling system 50. For purposes of the present disclosure, generator 14 could also be understood as ancillary equipment, including a rotor and a stator (not shown) in a generally conventional manner. A fuel system 40 is also understood as ancillary equipment. It should be appreciated that various other pieces and types of ancillary equipment might be used with engine 12 or a machine other than an internal combustion engine in other applications of the present disclosure. For example, hydraulic ancillary equipment could be coupled with engine 12 and employed for operating hydraulic actuators in off-highway construction equipment, mining machinery, or still others. Certain hydraulic equipment could itself be a machine that is commissioned in accordance with the present disclosure.

In the illustrated embodiment, air system 20 includes an air filter 22 and a compressor 24 structured to receive filtered intake air from air filter 22. Compressor 24 is coupled with a turbine 26 in a turbocharger 28. Compressor 24 can compress intake air for conveying to engine head 19 in a generally conventional manor. Multiple compression stages might be used, as well as intercoolers, aftercoolers, or still other air intake and handling equipment. An intake manifold 30 feeds the intake air to engine head 19.

Exhaust system 32 can include various exhaust treatment equipment or exhaust treatment stages fluidly between turbocharger 28 and a tailpipe or exhaust stack 32. An exhaust manifold (not shown) would feed exhaust to turbocharger 28 in a generally conventional manner. In the illustrated embodiment exhaust system 32 includes a catalyst 34 such as a diesel oxidation catalyst (DOC) and/or a selective catalytic reduction catalyst (SCR) and a diesel particulate filter (DPF) 36. It will be appreciated that various other exhaust handling and exhaust treatment equipment might be used, such as a tank for diesel exhaust fluid or urea water, a fluid injector coupled with the tank, and a variety of other types of equipment for treating exhaust emissions from engine 12.

Fuel system 40 may include a fuel tank 42, a low pressure fuel transfer pump 44, and a high pressure pump 46 coupled with a fluid pressure reservoir or common rail 48. Fuel tank 42 might contain liquid diesel distillate fuel, gasoline, cryogenically stored gaseous fuels such as liquid natural gas (LNG), or still another type of fuel. Fuel system 40 could also be equipped to inject multiple different types of fuel, such as a liquid fuel and a gaseous fuel in a so-called dual fuel application. Where cryogenically stored gaseous fuel is used additional equipment such as a vaporizer could be provided. Common rail 48 could include a single, monolithic pressure vessel, a plurality of separate pressure accumulators coupled together in a so-called daisy chain arrangement, or still another configuration. In still other instances, engine 12 could be equipped with unit pumps or the like, and could be direct injected, port injected, or structured for fuel delivery into or upstream intake manifold 30.

Cooling system 50 may include a plurality of heat exchangers, including a first heat exchanger 52 that is structured to exchange heat between engine coolant and the ambient environment, for example, as well as a second heat exchanger 54 that is structured to exchange heat between engine coolant and another engine operating fluid. For instance, heat exchanger 52 could include a conventional radiator. Heat exchanger 54 could include an engine oil cooler, a transmission fluid cooler, or still another type or purpose of heat exchanger. In an implementation, engine coolant is circulated through heat exchangers 52 and 54 from a coolant outlet 56 in engine block 18 to a coolant inlet 58 in engine block 18. No limitation is intended with regard to the plumbing, flow direction or pattern, or other aspect of design of cooling system 50. In FIG. 1 the cross-hatched arrows illustrate an example coolant flow, but analogously no limitation is intended.

As noted above, system 60 is provided for commissioning engine 12. From the forgoing description it will be appreciated that engine 12 is one of only numerous types of machines that might be commissioned according to the present disclosure. The various ancillary equipment described in connection with engine 10 is also exemplary only. Accordingly, the description herein of engine 12 should be understood to refer analogously to any other machine contemplated within the present context. Likewise, at least with respect to commissioning the description of any of the ancillary equipment should be understood to refer to any other ancillary equipment that might be used. System 60 includes a plurality of commissioning probes structured to monitor a plurality of operating parameters of engine 12, such as temperatures, pressures, speeds, position, flow rates, mechanical strain, or still others, as discussed herein. System 60 also includes a user interface 62 coupled with the plurality of commissioning probes.

Virtually all modern internal combustion engines, and many other machines for that matter, include numerous sensors that are resident upon the subject machine. In the case of an engine, an oxygen sensor or lambda sensor, exhaust temperature sensors, fluid pressure sensors, engine temperature sensors, engine speed sensors, and many others are installed at the factory. Sensors not intended for replacement, outside of repair or regular service intervals at least, are typically used to control aspects of machine operation, and can be understood in the present context as control sensors. A few examples contemplated in the present context include an engine speed sensor 60, a crankcase temperature sensor 55, an intake manifold pressure sensor 64, an intake air or temperature sensor 68, an exhaust temperature sensor 70, a common rail pressure sensor 72, an engine coolant temperature sensor 74 at heat exchanger 52, an engine coolant or oil temperature sensor 78 at heat exchanger 54, a temperature sensor 76 at coolant outlet 56, and another temperature sensor 80 at coolant inlet 58, could be standard equipment. Those skilled in the art will contemplate many other sensors not listed that could be understood as control sensors and, moreover, engines and other machines are contemplated herein that would not use each or perhaps even any of the exemplary control sensors listed. A sensor in the context of the present disclosure is any electronic device or group of devices capable of switching between or among at least two states. A sensor might have a varying analog output state, switch on, switch off, or otherwise respond to a change in the presence, amplitude, duration, frequency, or other physical condition of the operating parameter of interest.

While the various control sensors that are resident on and semi-permanently installed on machine system 10 will typically be employed in commissioning, the present disclosure also provides for additional commissioning probes in system 60 that are not used for ordinary control of machine system 10 outside of the commissioning context. In an implementation, system 60 may be provided as a kit that is used by a technician to perform commissioning tests, and in addition to user interface 62 the kit can contain a plurality of auxiliary sensors to be temporarily mounted or coupled with machine system 10 for commissioning purposes. The auxiliary sensors could even be sacrificial in the sense that they might not be expected to live over the course of a service life or even a single maintenance interval when installed on machine system 10. In an implementation, the auxiliary sensors could include some of the sensors already described, others not described, and still others including, for example, a cooling system sensor 31 positioned fluidly between heat exchangers 52 and 54, an exhaust stack temperature sensor 88, a turbocharger temperature or pressure sensor 90 that could be coupled with either one of compressor 24 or turbine 26, a fuel quality sensor 86 positioned fluidly between common rail 48 and pump 46, or elsewhere in fuel system 40, a water temperature sensor 84 that could sense the temperature of ambient water within which a marine vessel, for example, is located, a vessel speed sensor 82, and potentially many others. In an implementation, control sensors as discussed herein could include at least an engine speed sensor 51, a temperature sensor such as temperature sensor 80, a fluid pressure sensor such as common rail fuel pressure sensor 72, each of which is coupled with an engine control module or engine controller 53 ("ECM 53"). The auxiliary sensors could include at least a temperature sensor and a pressure sensor coupled with ancillary equipment. From the forgoing description it will be understood that, depending upon the application, many different sensors might be considered a control sensor, with other sensors considered to be auxiliary sensors. System 60 will be structured to exploit sources of data already on-board a machine system, and provide additional sources of data from sources that are applied for the purpose of commissioning. System 60 could further include one or more wiring harnesses 61 that are structured to connect the plurality of auxiliary sensors to user interface 62.

Figure 2:
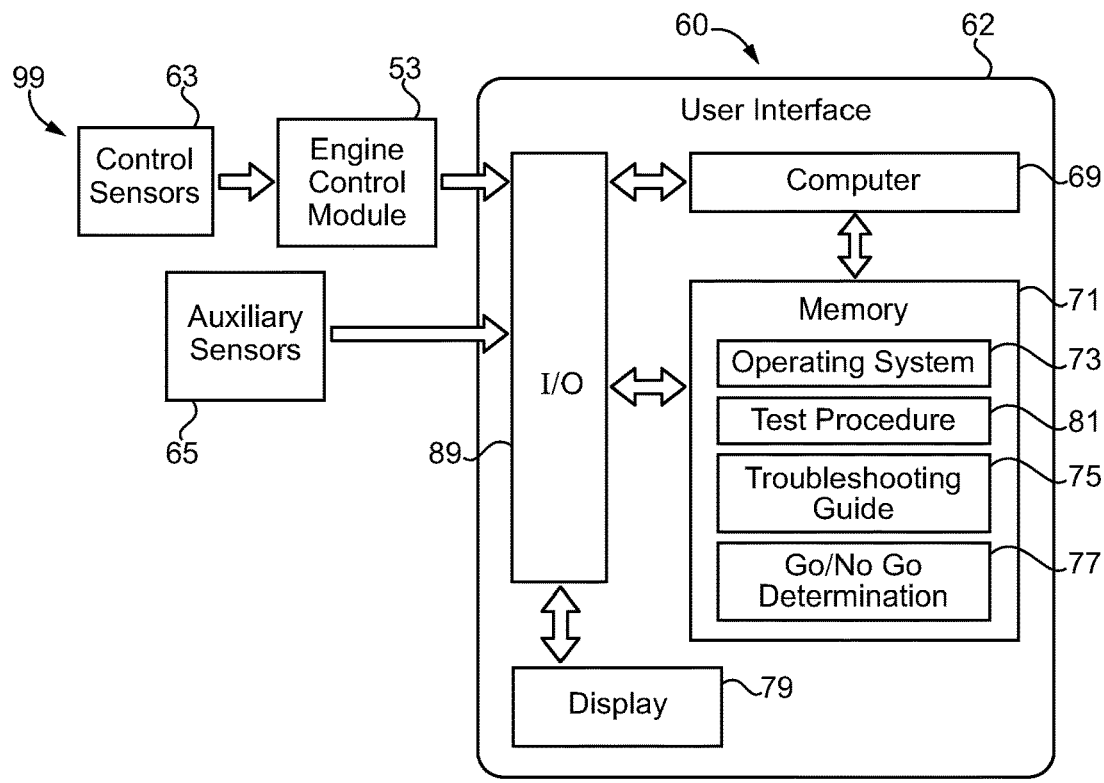
FIG. 2 is a block diagram of components in a system for commissioning a machine, according to one embodiment.

Referring also now to FIG. 2, there is shown a block diagram 99 illustrating features and attributes of system 60. Control sensors are shown at block 63, coupled with ECM 53. Auxiliary sensors are shown at block 65. It will be appreciated that user interface 62 may be coupled with ECM 53 to receive data produced by control sensors 63 according to generally conventional practice for diagnostic and servicing purposes used in computer controlled machinery. User interface 62 includes a computer, such as any suitable microprocessor or field programmable gate array (FPGA), shown at block 69, and a computer readable memory 71 coupled with computer 69. Computer 69 is structured to receive test data from the plurality of commissioning probes, and to electronically store a commissioning profile for engine 12 that is based on the test data on memory 71. It will be appreciated that system 60 could be coupled with machine system 10 prior to an initial voyage, in a marine vessel application, and test data gathered during the initial voyage whenever conditions suitable for testing are detected. A variety of different conditions might also be used for gathering test data, such as both steady state conditions and transient response conditions, for example. Computer 69 can operate to store test data periodically, intermittently or continuously over the course of an extended period of time that could be minutes, hours, days, or weeks, for example. Memory 71 stores various software components, including an operating system 73, test procedures 81, a troubleshooting guide 75, and a go/no go determination 77. User interface 62 also includes an input/output or I/O interface 89, and a display 79 whereby a user such as a commissioning technician can interact with system 60. The present disclosure could be implemented on or with assistance of a laptop configured with appropriate software.

Figure 3:
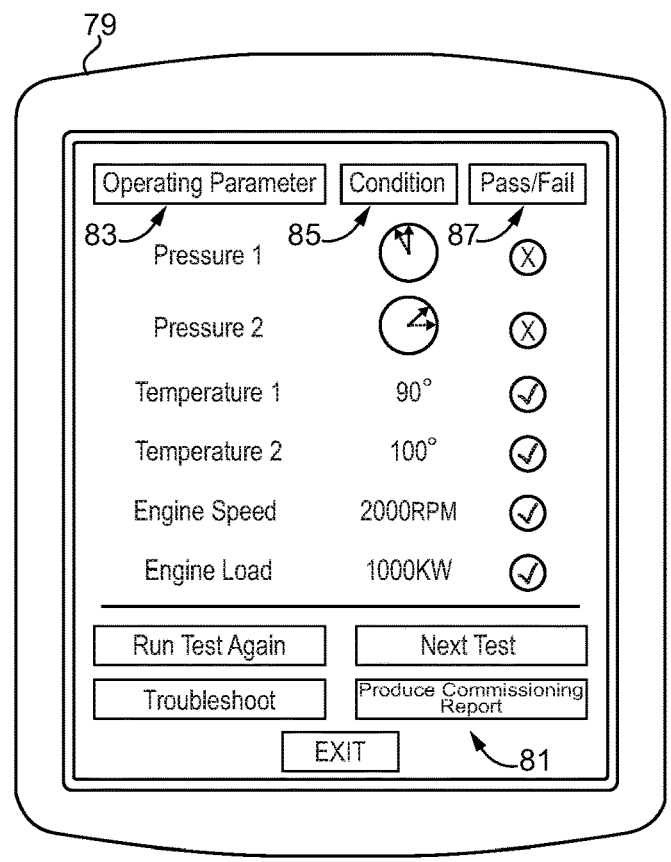
FIG. 3 is a diagrammatic view of a display in a user interface of a system for commissioning a machine, according to one embodiment.

Referring now to FIG. 3, there is shown a view of an example display 79 as it might appear during commissioning a machine or machine system according to the present disclosure. On display 79, a plurality of touchscreen controls are shown at 81, including a Run Test Again command, a Next Test command, a Troubleshoot command, a Produce Commissioning Report command, and an EXIT command. Also displayed on display 79 are a plurality of operating parameters, including Pressure 1, Pressure 2, Temperature 1, Temperature 2, Engine Speed, and Engine Load. Also shown on display 79 are indicators 85 for a condition of each of the operating parameters. It can be seen that virtual gauges are displayed for Pressure 1 and Pressure 2, including a solid arrow indicating, for example, an actual reading in comparison with a dashed arrow that indicates an expected or desired reading. Temperature 1 and Temperature 2 are shown with actual or apparent values, as is the case with Engine Speed and Engine Load. Also displayed on display 79 is a pass/fail indicator 87 for each of the plurality of operating parameters. An X shown for Pressure 1 and Pressure 2 indicates that each of Pressure 1 and Pressure 2 has failed the current test. A shown in connection with each of the other operating parameters indicates a pass state. The present disclosure contemplates other strategies for visually or audibly communicating states or status to an operator.

Construction of certain installations and relatively large and complex machinery systems such as power generating stations, oil or gas platforms, mines, marine vessels and still others can be extraordinarily complex and lengthy undertakings. When a machine such as one or more internal combustion engines are delivered for use in such applications, the machine may sit idle for months or even years before it is actually permanently installed in preparation for placing into service. Such machines can thus be exposed to the elements for long periods of time, which can impact the performance response of the machine that is observed when operation commences. Moreover, while manufacturers and dealers often specify certain types of equipment, including ancillary equipment as discussed herein, with which the machine is optimally used, owners often utilize other types of ancillary equipment. A performance response of the ancillary equipment during service with a particular machine might be different from the performance response of ancillary equipment with which the machine is intended to be used, or with which the machine was initially tested. For these and other reasons a machine can be subjected to different conditions and different demands in an actual service environment versus the conditions and demands for which the machine is optimized.

Computer 69 may further be structured to determine a compensation factor that is based on a difference between a performance response of ancillary equipment connected with the machine, and an expected response. The commissioning profile for the machine mentioned above is then based on the compensation factor. Computer 69 may further be structured to compare the commissioning profile to a target profile, and to output a commissioning suitability signal that is based on the comparing of the commissioning profile to the target profile, as further discussed herein. It is contemplated there are at least two different ways that computer 69 might obtain information used in calculating the compensation factor. The compensation factor might include a numerical offset value or a numerical multiplier, as further discussed herein. A first way computer 69 might calculate the compensation factor would be on the basis of the receipt of test data produced by at least one of the plurality of commissioning probes that is coupled with the ancillary equipment. The test data could then be compared with expected data, and a difference serve as, or as the basis for, the compensation factor. In one example, the compensation factor might be or be based upon a difference in temperature between an observed coolant temperature at coolant inlet 58, for example, or between heat exchanger 52 and 54 as indicated by sensor 31. In such an example the compensation factor could include a numerical difference in temperatures, observed where cooling system 50 is a different cooling system operating with different efficiency than a cooling system expected to be used with machine system 10. Another example could include a compensation factor based upon a difference between an observed or apparent fuel pressure and an expected fuel pressure. Differences in a pressure in turbocharger 28, a difference in exhaust temperatures, a difference in engine speed or engine power output, or any of the other sensed and monitored operating parameters discussed herein can serve as the basis for determining a numerical offset or a multiplier by which test data is compensated. In still another example, a certain electrical power output of generator 14 might be expected at a particular combination of engine speed, engine load, charge air pressure, and fueling rate or amount, and various other factors. In such an instance the performance response of ancillary equipment, generator 14, could be different from an expected response, which might in turn be a result of or based in part upon the use of ancillary equipment different from ancillary equipment for which engine 12 is optimized. Cooling efficacy of cooling system 50, efficiency of fuel pump 46, turbocharger design, and a host of other factors could account for the difference between the performance response and the expected response. As noted above, computer 69 is structured to account for such disparities by way of the compensation factor in determining the commissioning profile.

In an implementation, the commissioning profile can include performance data indicative of a plurality of performance criteria of engine 12. A first subset of the performance data may be based on the test data compensated by way of the compensation factor, and a second subset of the performance data may be based on the test data uncompensated, or in other words not compensated by way of a compensation factor. Embodiments are contemplated where the first subset of the performance data includes data indicative of at least one of a temperature criterion, a pressure criterion, a fluid flow criterion, or an efficiency criterion. The data could be the product of raw test data compensated by way of an offset or multiplier as discussed herein. The second subset of the performance data could include the raw test data itself. While the performance response of the ancillary equipment could include at least one of a temperature response, a pressure response, a fluid flow response, or an efficiency response, the present disclosure is not thereby limited. In the context of an engine system it will be appreciated that the commissioning profile may include the data set, including the first subset and the second subset as discussed herein, and potentially other subsets including performance data compensated by way of still other compensation factors, for a plurality of performance criteria of engine 12. Thus, while FIG. 3 depicts at a high level two pressures, two temperatures, engine speed and engine load, in other instances there may be a far greater number of operating parameters of interest. In contrast, embodiments are contemplated where the present disclosure is applied merely to a single performance factor that is of interest in commissioning a machine.

INDUSTRIAL APPLICABILITY

Figure 4:
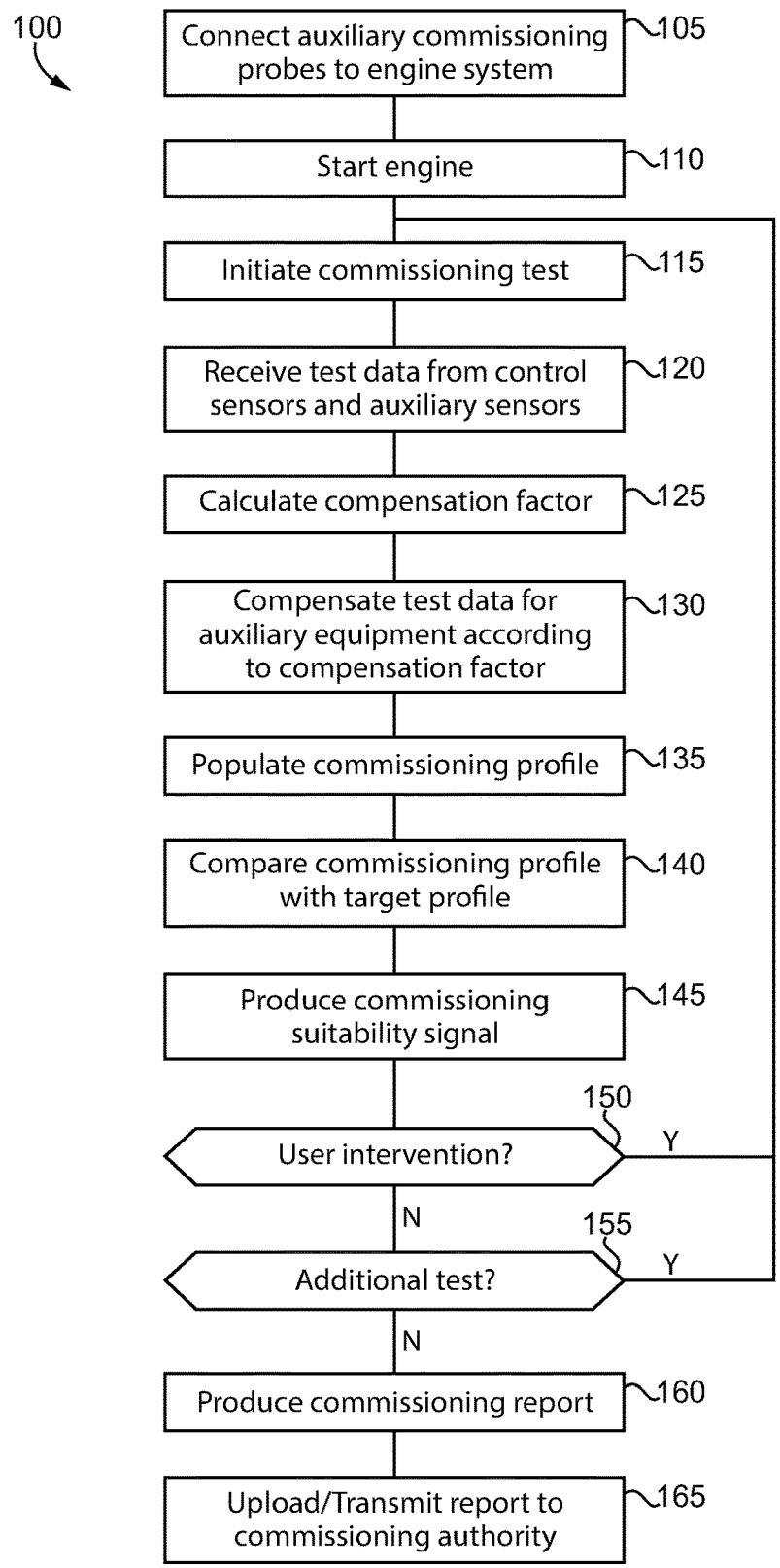
FIG. 4 is a flowchart illustrating example control logic flow, according to one embodiment.

Turning now to FIG. 4, there is shown a flowchart 100 illustrating example process and control logic flow, according to one embodiment. At block 105, auxiliary commissioning probes are connected to an engine system such as machine system 10. From block 105 the process may advance to block 110 to start engine 12, and thenceforth to block 115 to initiate a commissioning test. User interface 62 could be used to initiate the tests and/or initiate monitoring to detect when conditions are suitable for testing. From block 115, the process can advance to block 120 to receive test data from control sensors and auxiliary sensors. It will be appreciated that receiving of the test data can include receiving test data during execution of a commissioning test or commissioning test routine, which may have multiple different parts. At FIG. 3, the user can be prompted to move through each of the individual tests that are performed, and can navigate to different parts of an overall series of tests necessary for commissioning.

From block 120, the process may advance to block 125 to calculate the compensation factor, and to block 130 to compensate the test data for ancillary equipment according to the compensation factor. Raw temperature data or pressure data could be adjusted up or down based on the compensation factor, for instance. A load calculation could be modified according to the compensation factor. Still other mechanisms for processing raw sensor data based on a multiplier, an offset, or a performance coefficient, for example, will be apparent in view of the present disclosure. From block 130 the process can advance to block 135 to populate the commissioning profile, and from block 135 to block 140 to compare the commissioning profile with a target profile. It will be understood that at FIG. 3 the pass/fail condition 87 can be determined by comparing the commissioning profile for at least some of the operating parameters of interest with a target profile. In an implementation, the target profile can include stored ranges of values for each of the plurality of operating parameters of interest in that subtest or the commissioning test as a whole.

From block 140 the process may advance to block 145 to produce a commissioning suitability signal. The commissioning suitability signal can include a signal produced on user interface 62 in conjunction with the pass/fail determination. The commissioning suitability signal might have two potential values, with one associated with a pass or suitability state and the other associated with a fail or unsuitability state. In still other instances the subject signal might have a range of values. It will therefore be appreciated that while FIG. 4 illustrates a simplified version of a commissioning test routine showing the results of only a few commissioning suitability signals, in an actual application there might be many such signals for many such tests. The subject signal could be associated with a single operating parameter, a combination of operating parameters, a single part of a commissioning procedure, or the process of commissioning as a whole. From block 145 the process may advance to block 150 to query, is there user intervention? It is contemplated that a user intervention prompt could be produced on display 79 indicating to a user the opportunity to run a test again, or change certain factors so that commissioning can be successful at least with respect to a particular operating parameter. For example, a user intervention prompt can be produced in relation to Pressure 1 or Pressure 2 as shown in FIG. 3 that has failed or is presently in a fail condition of the commissioning test. A user can utilize a stored troubleshooting guide, for example, in an attempt to run the test again and achieve a pass condition. In this general manner the present disclosure can provide a user with actionable information during the commissioning procedure rather than merely running the entire test and later reviewing a commissioning report in an attempt to track down errors or insufficiencies or other problems. Gathering data as to many different operating parameters of both the ancillary equipment and the machine to be commissioned is also contemplated to enable a user to act at a location that is actually and temporally as close as possible to the machine during commissioning. In other words, efficiency gains can be expected by enabling user intervention during commissioning and by the commissioning technician or other personnel themselves.

If, at block 150, there is user intervention, the process may loop back to initiate the same commissioning test again, or could exit. If no, the process may advance to block 155 to query is an additional test desired. If yes, the process can loop back to block 115, or could exit. If no additional test is to be executed, the process can advance to block 160 to produce a commissioning report. From block 160 the process can advance to block 165 to upload/transmit the report to a commissioning authority such as a dealer or manufacturer. It will be recalled that memory 71 includes a go/no go determination, which can be understood as logic for determining whether all criteria for commissioning are satisfied. In other words, once the commissioning report is completed the commissioning report can be processed locally, and suitability for commissioning determined. The report that is then transmitted to a commissioning authority can be used to confirm the conclusions of the go/no go determination 77, communicate the confirmation back, and formally commission the subject machine.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure.

Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having" or the like are intended to be open-ended terms. Further, the phrase "based on" is intended to mean "based, at least in part, on" unless explicitly stated otherwise.

What is claimed is:

1. A system for commissioning a machine comprising:
a plurality of commissioning probes structured to monitor a plurality of operating parameters of the machine;
a user interface coupled with the plurality of commissioning probes, and including a computer and a computer readable memory;
the computer being structured to receive test data from the plurality of commissioning probes, and to store a commissioning profile for the machine that is based on the test data on the computer readable memory;
the computer being further structured to determine a compensation factor that is based on a difference between a performance response of ancillary equipment connected with the machine, and an expected response, and to determine the commissioning profile based on the compensation factor; and
the computer being further structured to compare the commissioning profile to a target profile, and to output a commissioning suitability signal that is based on the comparing of the commissioning profile to the target profile.

2. The system of claim 1 wherein the plurality of commissioning probes includes a plurality of control sensors resident on the machine, and a plurality of auxiliary sensors, and wherein the system further includes a wiring harness coupling the plurality of auxiliary sensors to the user interface.

3. The system of claim 2 wherein the machine includes an engine, and wherein the plurality of control sensors includes an engine speed sensor, a temperature sensor, and a pressure sensor each coupled with an engine control module, and wherein the plurality of auxiliary sensors includes a temperature sensor and a pressure sensor coupled with the ancillary equipment.

4. The system of claim 1 wherein the commissioning profile includes performance data indicative of a plurality of performance criteria of the machine, and the performance data including a first subset that is based on the test data compensated by way of the compensation factor, and a second subset that is based on the test data uncompensated.

5. The system of claim 4 wherein the compensation factor includes an offset value or a multiplier.

6. The system of claim 4 wherein at least one of the plurality of commissioning probes is coupled with the ancillary equipment, and wherein the computer is structured to calculate the compensation factor based on test data produced by the at least one of the commissioning probes.

7. The system of claim 4 wherein the first subset of the performance data includes data indicative of at least one of a temperature criterion, a pressure criterion, a fluid flow criterion, or an efficiency criterion.

8. The system of claim 7 wherein the computer is further structured to generate on the user interface a testing intervention prompt.

9. The system of claim 4 wherein the computer is further structured to output a plurality of commissioning suitability signals based on the comparing of the commissioning profile to the target profile, and each of the plurality of commissioning suitability signals being indicative of satisfaction of one of the plurality of performance criteria.

10. A method of determining suitability of a machine for commissioning comprising:
receiving test data produced by a plurality of commissioning probes coupled with a machine to be commissioned, and being indicative of a plurality of operating parameters of the machine;
populating a commissioning profile for the machine based on the test data;
determining a compensation factor based on a difference between a performance response of ancillary equipment connected to the machine, and an expected response;
determining the commissioning profile based on the compensation factor;
comparing the commissioning profile to a target profile; and
producing a commissioning suitability signal based on the comparing of the commissioning profile to the target profile.

11. The method of claim 10 wherein the machine includes an engine, and the ancillary equipment includes at least one of cooling equipment, fueling equipment, intake equipment, or exhaust equipment.

12. The method of claim 10 wherein the populating of the commissioning profile for the machine includes populating the commissioning profile with performance data indicative of a plurality of performance criteria of the machine.

13. The method of claim 11 wherein a first subset of the performance data is based on the test data compensated by way of the compensation factor, and a second subset of the performance data is based on the test data uncompensated.

14. The method of claim 13 wherein the compensation factor includes at least one of a multiplier and a numerical offset.

15. The method of claim 11 wherein the performance response of the ancillary equipment includes at least one of a temperature response, a pressure response, a fluid flow response, or an efficiency response.

16. The method of claim 13 wherein the receiving of the data further includes receiving data from a plurality of control sensors resident on the machine, and a plurality of auxiliary sensors.

17. The method of claim 16 wherein the receiving of the test data includes receiving the test data during execution of a commissioning test, and further comprising generating on a user interface a testing intervention prompt during the execution of the commissioning test.

18. A machine system comprising:
a machine;
ancillary equipment connected with the machine;
a commissioning system including a plurality of commissioning probes structured to monitor a plurality of operating parameters of the machine;
a user interface coupled with the plurality of commissioning probes, and including a computer and a computer readable memory;
the computer being structured to receive test data from the plurality of commissioning probes, and to store a commissioning profile for the machine on the computer readable memory based on the test data; and
the computer being further structured to determine a compensation factor that is based on a difference between a performance response of the ancillary equipment, and an expected response, and to determine the commissioning profile based on the compensation factor.

19. The machine of claim 18 wherein the machine includes an engine, and the ancillary equipment includes at least one of cooling equipment, fueling equipment, intake equipment, or exhaust equipment.

20. The machine of claim 19 wherein the commissioning profile includes performance data indicative of a plurality of performance criteria of the machine, and the performance data including a first subset that is based on the test data compensated by way of the compensation factor, and a second subset that is based on the test data uncompensated.

* * * * *